United States Patent [19]
Anlage et al.

[11] Patent Number: 5,900,618
[45] Date of Patent: May 4, 1999

[54] NEAR-FIELD SCANNING MICROWAVE MICROSCOPE HAVING A TRANSMISSION LINE WITH AN OPEN END

[75] Inventors: Steven Mark Anlage, Laurel; Frederick Charles Wellstood, Lanham; Kosta Vlahacos, Baltimore; David E. Steinhauer, Laurel, all of Md.

[73] Assignee: University of Maryland, College Park, Md.

[21] Appl. No.: 08/917,465

[22] Filed: Aug. 26, 1997

[51] Int. Cl.$^6$ ........................................ G01J 1/20
[52] U.S. Cl. ........................................ 250/201.3; 250/306
[58] Field of Search ........................... 250/201.3, 234, 250/306–309

[56] References Cited

U.S. PATENT DOCUMENTS

| | | | |
|---|---|---|---|
| 5,376,790 | 12/1994 | Linker et al. | 250/306 |
| 5,397,896 | 3/1995 | Weiss et al. | 250/306 |
| 5,489,774 | 2/1996 | Akamine et al. | 250/234 |
| 5,559,328 | 9/1996 | Weiss et al. | 250/306 |
| 5,619,035 | 4/1997 | Weiss et al. | 250/306 |

OTHER PUBLICATIONS

"A tunable microwave frequency alternating current scanning tunneling microscope", Stranick et al, *Rev. Sci. Instrum.*, vol. 65, No. 4, Apr. 1994, pp. 918–921.

"A versatile microwave–frequency–compatible scanning tunneling microscope", Stranick et al, *Rev. Sci. Instrum.*, vol. 64, No. 5, May 1993, pp. 1232–1234.

*Primary Examiner*—Que T. Le

[57] ABSTRACT

The microscope includes a microwave generator connected to a mismatched transmission line which terminates in a probe with an exposed end. When a sample is brought into close proximity with the exposed end of the probe, the frequencies and quality factors of the standing wave resonances on the transmission line between the source and the probe are modified. The microwave signal reflected from the end of the probe varies as the capacitance between the probe and the sample changes and as the conductivity of the sample changes. Scanning the sample relative to the probe allows generation of an image from the variation of the reflected signal. Alternatively, to image a device with the microscope, a microwave signal is applied to the device, the probe is scanned over the device, and the signal that is picked up is recorded. In a second embodiment, a first lock-in amplifier is used to lock in the microscope at the resonant frequency, and a second lock-in amplifier is used to detect a curvature of the resonance.

17 Claims, 9 Drawing Sheets

Fig. 5A
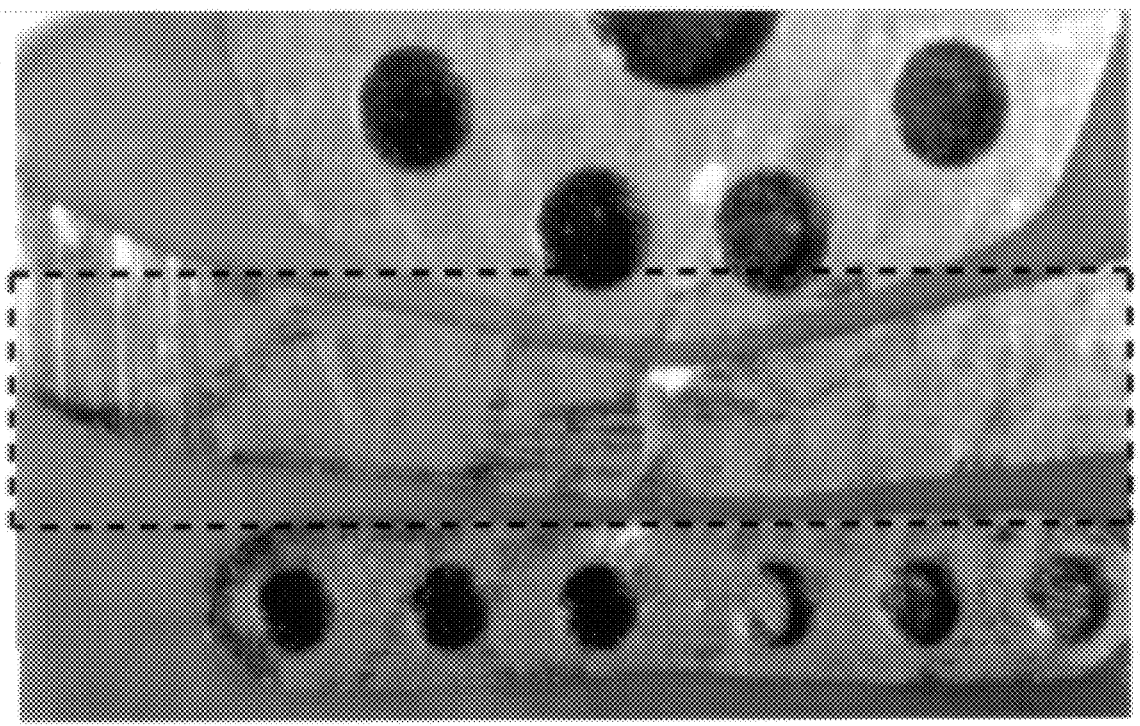
⊢——⊣ 1 mm
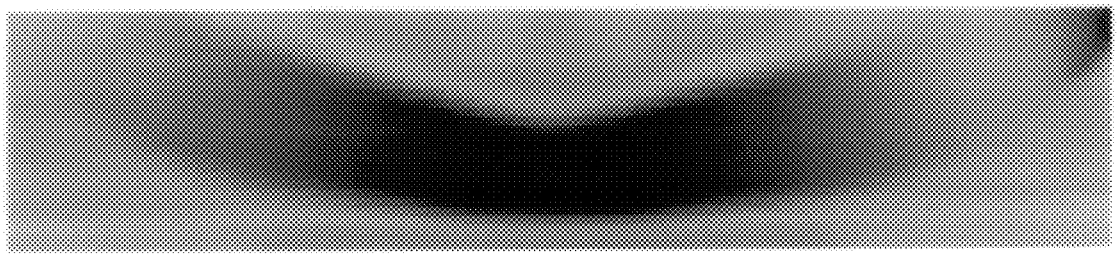
Fig. 5B

NEAR-FIELD SCANNING MICROWAVE MICROSCOPE HAVING A TRANSMISSION LINE WITH AN OPEN END

FIELD OF THE INVENTION

The present invention is directed to a near-field scanning microwave microscope and in particular for such a microscope capable of high spatial resolution and high sensitivity.

DESCRIPTION OF RELATED ART

The near field refers to an area relatively close to a source of radiation (closer than one wavelength), so that the radiation is treated as being divergent rather than parallel. Soohoo, J. Appl. Phys. volume 33, page 1276 (1962), Bryant and Gunn, Rev. Sci. Instrum. volume 36, page 1614 (1965), and Ash and Nichols, *Nature,* 237, 510 (1972), were the first to demonstrate a near-field scanning microwave microscope. At a frequency of 10 GHz, Ash and Nichols obtained microwave images with $\lambda/60$ resolution, where $\lambda$ is the free-space wavelength thereby showing that the diffraction limit could be breached via the use of evanescent waves from a small hole in a metallic plate. Since this initial work, near-field imaging has been accomplished in a variety of instruments which cover frequencies spanning the microwave to optical bands. Evanescent fields in the microwave region have been generated using the open end of a transmission line, a small hole in a waveguide, or a microstrip resonator.

Present technology is based mainly on scanned waveguides or cavities. Such technology suffers from poor signal throughput and poor spatial resolution and are not calibrated. Also, such technology is restricted in the range of frequency coverage and involves complicated measurement circuits and cumbersome geometries.

SUMMARY OF THE INVENTION

An object of the invention is to provide a microwave microscope having a high signal throughput and a high spatial resolution, and which can be calibrated to image absolute quantities.

Another object of the invention is to provide a microwave microscope having a wide frequency coverage.

Still another object of the invention is to provide a microwave microscope having a simple configuration.

Yet another object of the invention is to provide such a microscope having the ability to quantitatively measure surface sheet resistance, dielectric constant, dielectric loss tangent, and all components of electric and magnetic field at all points in space.

To achieve these and other objects, the present invention is directed to a scanning microscope for imaging a sample, the scanning microscope comprising: a generator for generating electromagnetic energy; applying means, receiving the electromagnetic energy from the generator means, for applying the electromagnetic energy to the sample to form a field of electromagnetic radiation around the sample; a coaxial transmission line with a probe at one end, the probe having an exposed end for placement in proximity with the sample, for receiving the electromagnetic radiation from the sample; detector means for detecting a magnitude of the electromagnetic radiation received by the probe and for output; the microscope can further include a table or other means for causing relative motion between the sample and the probe, and an analog/digital (A/D) converter and a computer for analyzing the imaging signal.

A second embodiment of the invention is directed to a scanning microscope as described in the preceding paragraph, wherein the exposed end of the probe is spaced from the sample to create a resonant circuit having resonant frequencies, one of which is selected, and further comprising feedback means for detecting a shift in the resonant frequency and for controlling the generator means in accordance with the shift in the resonant frequency so that a frequency of the electromagnetic radiation generated by the generator means equals the resonant frequency. The second embodiment can also include signal processing means, receiving the signal output by the detector means, for determining the shape of a resonant peak of the resonant circuit. The second embodiment can also include a microwave capacitor or other decoupling components to create a resonant transmission line.

The invention makes possible a near-field scanning microwave microscope that is based on a short, exposed, coaxial probe which is coupled to a resonant transmission line. The system operates over a large frequency range and achieves a spatial resolution of 10 $\mu$m or better using simple instrumentation. The spatial resolution is limited by the larger of the diameter of the inner wire of the coaxial probe, and probe-sample separation, so that finer tips could be used to achieve better spatial resolution, provided they are brought closer to the sample.

The present invention offers several potential advantages over existing systems, including the simplicity of the apparatus and wideband operation (from 0.01 to 50 GHz with appropriate connectors and sources). The invention has applications in high-frequency circuit diagnosis, the imaging of surface impedance, and the inspection of large-area wafers, among other areas.

In the preferred embodiment, the near-field probe can be formed by a small, open, rigid coaxial probe which is connected to the end of a segment of coaxial transmission line. When a voltage is applied to the far end of the line, an electric field appears at the exposed end of the probe, with the most intense fields being generated near the inner conductor. The spatial extent of this field, rather than the microwave wavelength, sets a lower limit on the spatial resolution. Very close to the end of the probe, the field is roughly uniform over the exposed area of the inner conductor (neglecting field enhancement at the edges), while far from the conductor, the field falls inversely with distance in the radiation limit. Thus, the spatial resolution of the instrument will be approximately equal to the diameter of the inner conductor, provided that it is brought closer to a sample than the diameter of the inner conductor of the coaxial probe.

A microscope with a 100 $\mu$m diameter probe center conductor according to the invention can operate in the 7.5–12.4 GHz range with spatial resolution of about 100 $\mu$m, corresponding to $\lambda/360$ at 12 GHz.

The microscope according to the invention can be used to measure topographic features of uniformly conducting or uniformly insulating samples. Quantitative topographic imaging with better than 0.1 $\mu$m vertical resolution using the frequency shift data has been demonstrated.

Such a microscope can accurately measure surface sheet resistance in $\Omega/\square$(Ohms/square) of conducting materials. A sheet resistance sensitivity of $\Delta R/R=5\times10^{-2}$ at R=100$\Omega/\square$ has been demonstrated, and samples with R between 0.4 and several thousand $\Omega/\square$ have been measured.

The microscope is also sensitive to the real and imaginary parts of the dielectric constant of insulating materials, as demonstrated in the paper by D. E. Steinhauer, et al, cited below.

The microscope is sensitive to vertical electric field lines which terminate on the surface of the exposed inner conductor. One can also tilt the probe to intercept the other components of the electric field and thus construct a complete vector electric field map at each point in three inner and outer conductors of the probe. One can also measure the three components of the microwave magnetic field at each point in space.

The microscope can also be used in a contact mode, in which the center conductor is extended beyond the outer conductor and dragged along the sample surface. Imaging in this mode with a scanning tunneling microscope tip shows that the spatial resolution of the microscope is better than 2 μm.

The inventors have set forth related concepts in the following papers, whose disclosures are hereby incorporated by reference in their entireties into the present disclosure:

S. M. Anlage et al, "Scanning Microwave Micrscopy of Active Superconducting Microwave Devices," *IEEE Transactions on Applied Superconductivity* Vol. 7, page 3686 (1997).

C. P. Vlahacos et al, "Near-field scanning microwave microscope with 100 μm resolution," *Applied Physics Letters*, vol. 69, page 3272 (1996); and D. E. Steinhauer et al., "Surface Resistance Imaging with a Scanning Near-Field Microwave Microscope," *Applied Physics Letters*, vol. 71, page 1736, (1997).

BRIEF DESCRIPTION OF THE DRAWINGS

Two embodiments of the invention will now be described in detail with reference to the drawings, in which

FIG. 5A shows a microstrip microwave transmission line;

FIG. 5B shows a result of imaging of the microstrip line carrying a microwave signal by use of the microscope of FIG. 1A in receiving mode;

DETAILED DESCRIPTION OF THE INVENTION

Figure 1A:
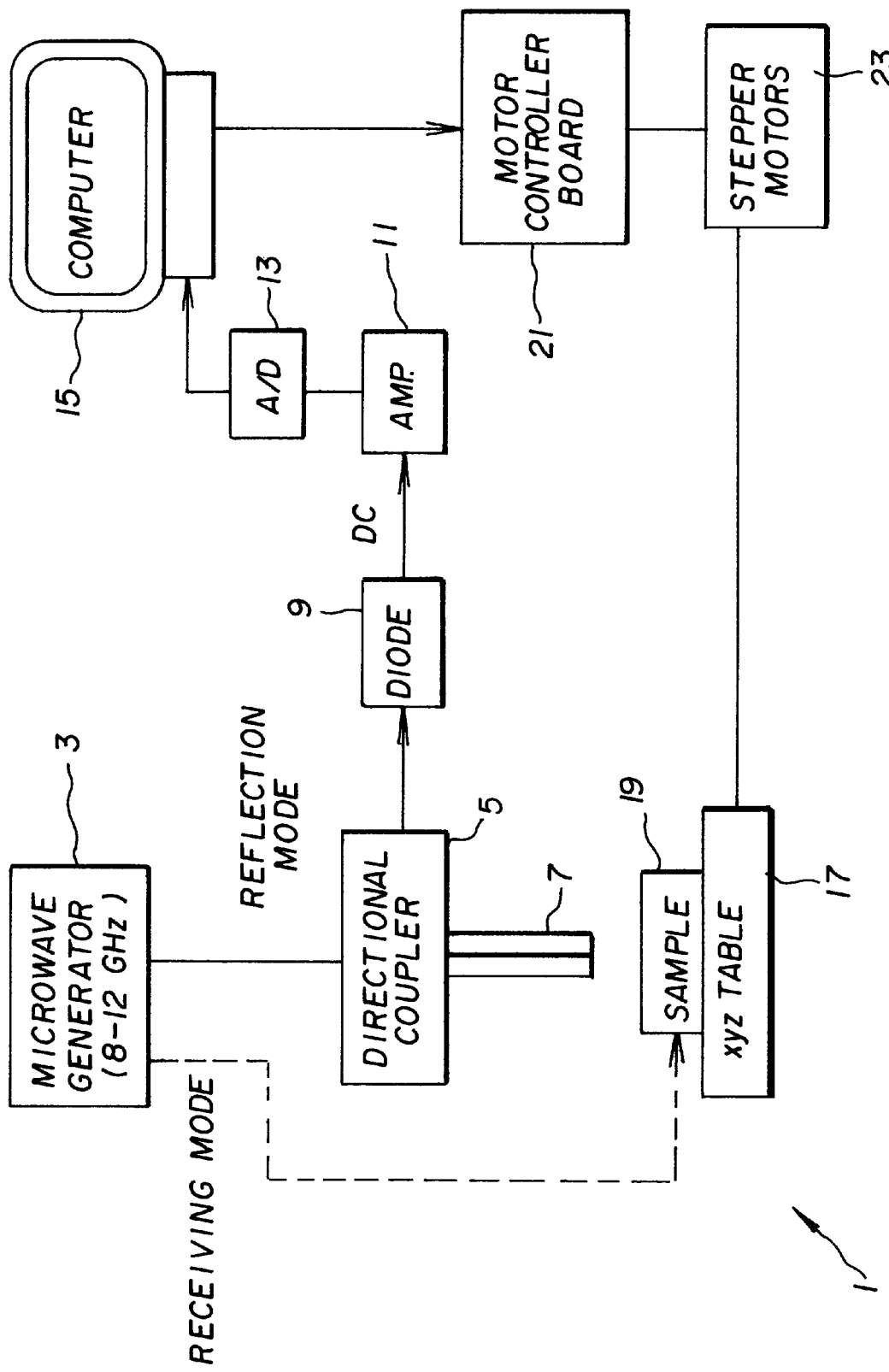
FIG. 1A shows a system schematic of a microscope according to the first embodiment.

A microscope 1 according to the first embodiment is shown in FIG. 1A. In microscope 1, in reflection mode, Wavetek 955 microwave source 3 is connected to the input port of a Miteq directional coupler 5, the short coaxial probe 7 is connected to a second port of coupler 5, and the reflection port of coupler 5 is connected to a microwave diode detector 9. With this arrangement, the diode detector produces a dc output voltage which is proportional to the power of the reflected microwave radiation. The diode output is filtered and amplified by amplifier 11 and monitored with an A/D (analog/digital converter) board 13 which is mounted in a personal computer 15.

In the generation of an image, a micrometer-based scanning table 17 is used to move the sample 19 under the tip of the probe, while the reflected microwave signal is monitored. Computer 15 includes a motor controller board 21, which actuates stepper motors 23 to move the table and thus the sample. The sample can be moved at speeds from 1 micron/sec to 25 mm/sec, and sampling of the signal is done at 30 to 100 Hz. The computer controls the positioning of the sample, records the output, and converts the resulting data into a false color or gray-scale image.

Figure 1B:
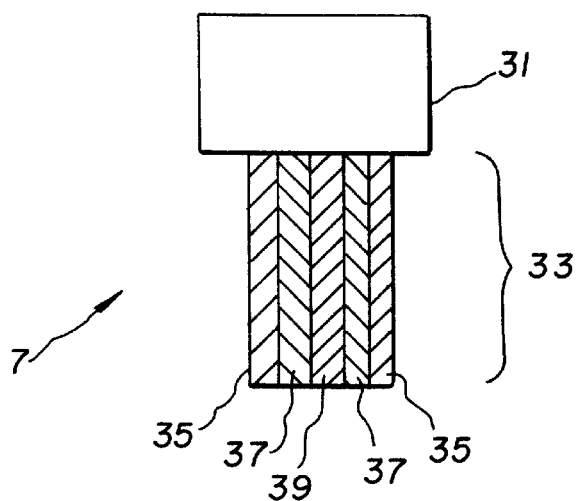
FIG. 1B shows a cut-away view of a probe used in the microscope of FIG. 1A.

As shown in FIG. 1B, the probe is made from a 50 ΩSMA connector 31 to which is attached a short (about 10 mm long) open section 33 of semi-rigid 50 Ω coaxial cable. The cable has an outer jacket 35 of stainless steel, a polytetrafluoroethylene (sold under the trade name Teflon) dielectric 37, and a center conductor 39 of silver-plated copper wire. Several probes have been used, made from coaxial cables with the following inner and outer conductor diameters: 480 μm and 2130 μm, 200 μm and 810 μm, 100 μm and 450 μm, and a scanning tunneling microscope tip which tapers from 480 μm to an atomically sharp point and 2130 μm.

Figure 1C:
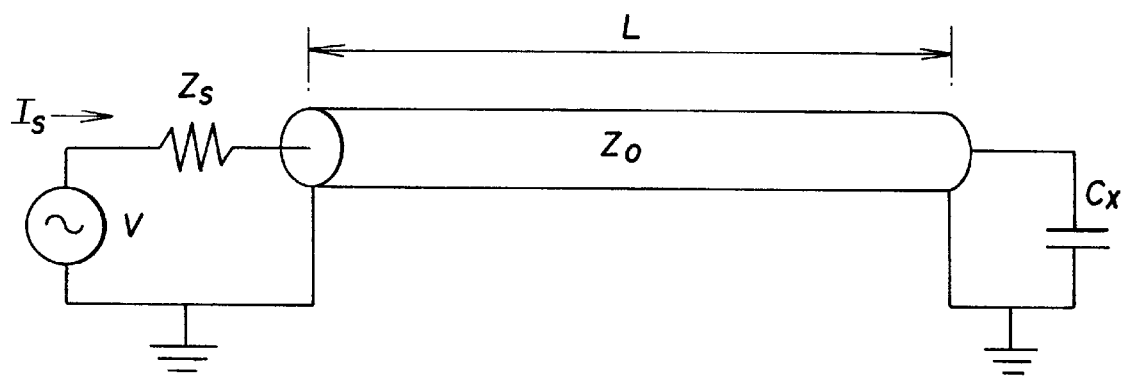
FIG. 1C shows an equivalent circuit to the microscope of FIG. 1A.

Microscope 1 can be modeled by the equivalent circuit of FIG. 1C. Such an equivalent circuit includes a resonant coaxial transmission line of total length L with a capacitor $C_x$ at one end and a mismatched microwave supply voltage $V(\omega)$ at the other and $\omega = 2\pi f$, where f is the frequency of the supplied microwave signal from the generator menas. $C_x$ is the capacitance between the sample and the inner conductor of the probe. The dependence of $C_x$ on position leads to contrast in the reflected image.

Standard transmission line theory gives the reflected voltage $V_-$ as:

$$|V_-| = \frac{|V(\omega)|}{\left|\left(1+\frac{Z_s}{Z_0}\right)\left(\frac{1+i\omega C_x Z_0}{1-i\omega C_x Z_0}\right)e^{-2ikL} + \left(1-\frac{Z_s}{Z_0}\right)\right|}$$

$$\approx \frac{|V(\omega)|}{\sqrt{2\left[1+\left(\frac{Z_s}{Z_0}\right)^2\right] + 2\left[1-\left(\frac{Z_s}{Z_0}\right)^2\right]\cos(2k(L+cZ_0 C_x))}}$$

where $\kappa = \omega/c'$, c and c' are the speeds of light in vacuum and in the transmission line, and $Z_0$ and $Z_s$ are the line and source impedances. The approximation shown in the second line of the equation above holds for $\omega C_x Z_0 \ll 1$.

The equation above provides an understanding of the behavior of the microscope. For $Z_s \neq Z_0$, the transmission line is mismatched to the source, and well-defined standing wave resonances appear on the line. This is the limit in which microscope 1 operates. As the probe approaches a conducting part of a sample, $C_x$ increases. From the equation above, an increase in $C_x$ is equivalent to a lengthening of the transmission line by $cZ_0 C_x$. In normal operation, microwaves are applied at a frequency which is somewhat off resonance. Increasing the length of a transmission line causes all of the resonant frequencies to decrease and V to change.

Figure 2A:
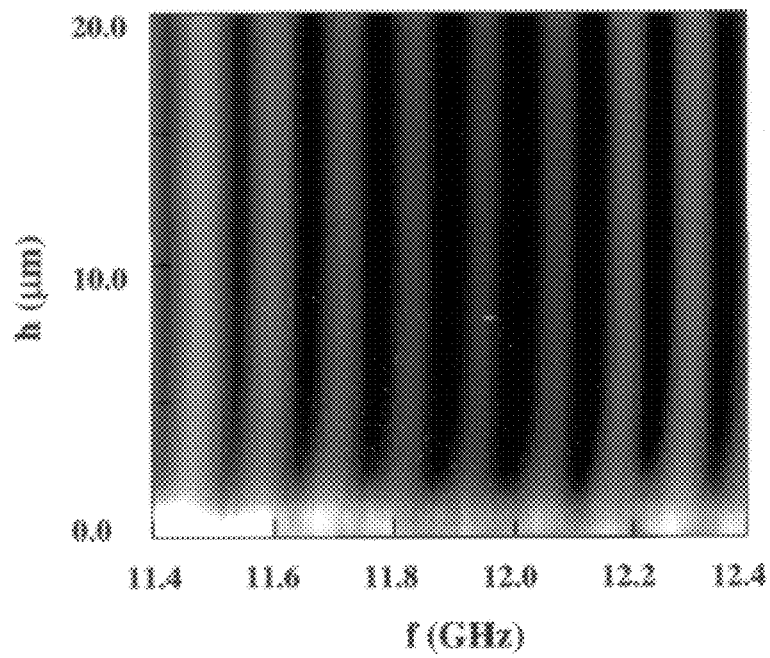
FIGS. 2A and 2B show experimental and calculated plots, respectively, of reflected voltage as a function of frequency and lift-off from a steel surface for a probe whose inner conductor diameter is 200 μm.

The reflected microwave voltage was measured as a function of frequency and lift-off from a steel surface, using a probe with a 200 $\mu$m inner diameter. FIG. 2A shows the results of such a measurement, in which dark regions represent more reflected power and light regions represent less. The dark vertical bands occur when the source is in resonance with the transmission line. The resonances occur about every 125 MHz, corresponding to L=1.1 m and c'=2.61×10$^8$ m/s. When the probe is close to the surface, the resonance bands bend towards lower frequencies, corresponding to a reduction of the resonance frequency. The maximum observed (and expected) shift is about 60 MHz, one-half of the distance between the resonances, when the probe tip goes from an open condition (far from the sample) to being effectively shorted ($C_x$ large, close to the sample).

FIG. 2A also shows that the resonance bands wash out when the probe is very close to the surface. This decrease in resonance quality factor Q is due to the surface resistance of the sample and to radiative losses. By monitoring the Q, one can directly image microwave losses and surface resistance.

Figure 2B:
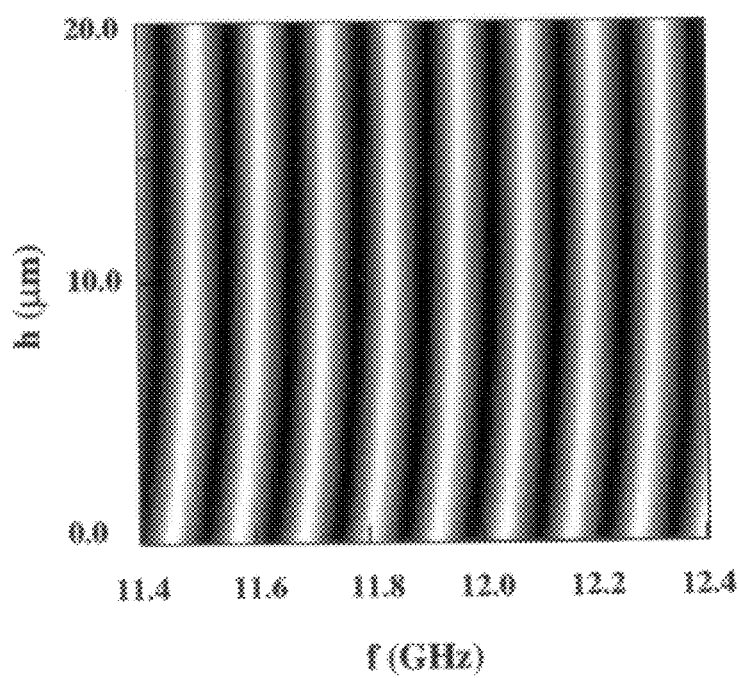

For comparison, FIG. 2B shows the reflected voltage calculated from the equation set forth above using a parallel plate approximation for $C_x$. The bending of the resonance bands is well reproduced by the model.

Figure 3:
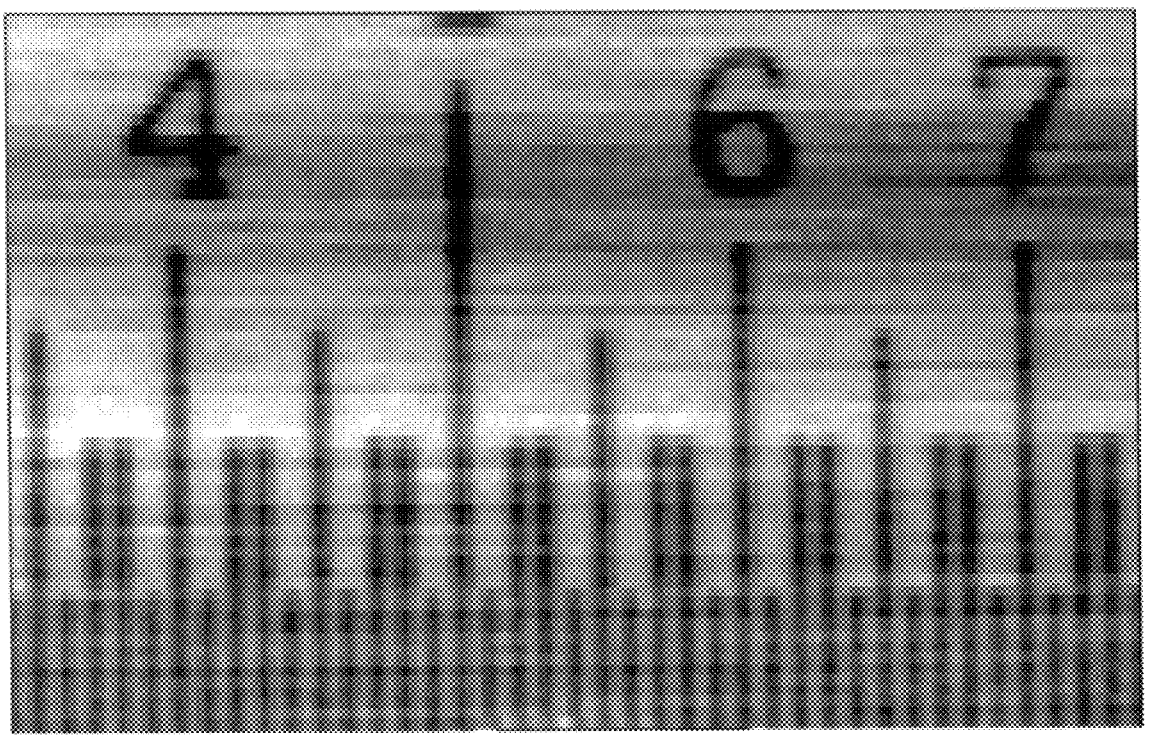
FIG. 3 shows an image of a steel rule formed with a probe whose inner conductor diameter is 100 μm.

To investigate the capabilities of the invention, a variety of samples were imaged. For example, FIG. 3 shows a reflected microwave image of a Starrett 100ths-inch steel rule taken with the 100 $\mu$m probe. This image was taken at 12 GHz with a probe-sample separation of 20 $\mu$m. The marks on the ruler are indentations approximately 250 $\mu$m deep and 120 $\mu$m wide. The system easily resolves the marks, with the contrast due to changes in reflected power as the capacitance varies between the probe tip and the sample surface. For this image, the root mean square noise voltage at each pixel is 0.9 $\mu$V, and the approximate signal strength at a point over one of the grooves is 11 $\mu$V. The signal-to-noise ratio, which goes as the square of the voltage, is approximately 150.

Figure 4A:
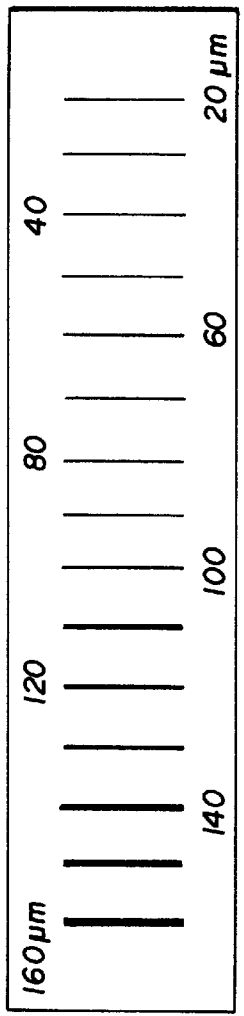
FIG. 4A shows thin film lines deposited on a glass disk; the numbers referring to the line widths.
Figure 4B:
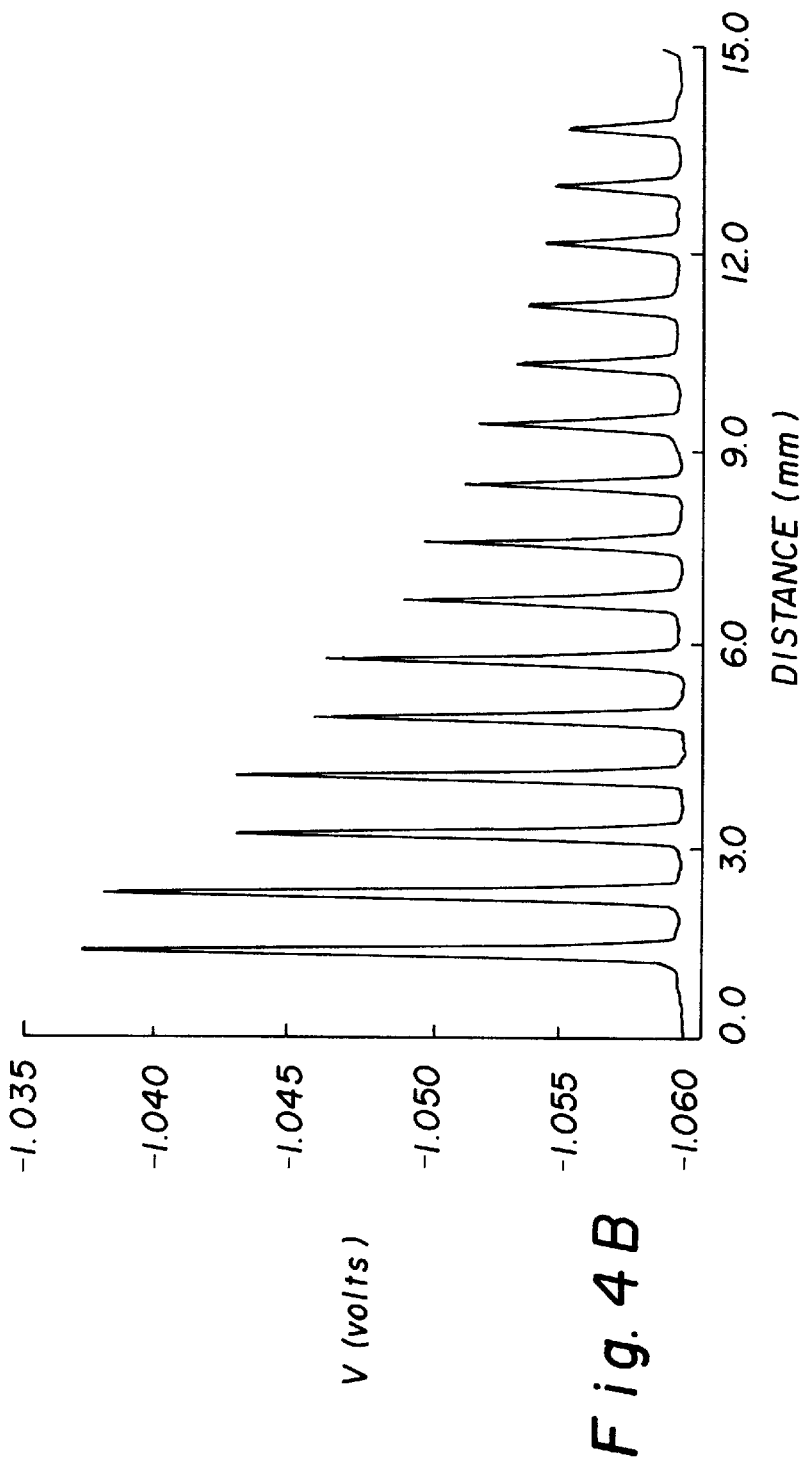
FIG. 4B shows a result of detection of the rulings of FIG. 4A.

To determine the spatial resolution of the invention, a thickness gauge from a Fowler optical comparator was scanned using the 100 $\mu$m probe. The gauge is a flat, 27 mm diameter glass disk with a parallel lines made from a thin-film Cr. The lines range in width from 20–160 $\mu$m, as shown in FIG. 4A. Scanning at 10 GHz and a height of 50 $\mu$m, the system was able to detect all the lines, as shown in FIG. 4B. The spatial resolution can be deduced from the image profile of the narrowest lines; the full width at half maximum of the 20 $\mu$m line was 100 $\mu$m, indicating a spatial resolution of 100 $\mu$m. From this and similar measurements on other probes, it is apparent that the spatial resolution is set by the diameter of the inner conductor of the probe, as expected.

The system according to the first embodiment can also be used to image active microwave circuits. To do so requires converting the instrument to receiving mode, as shown by the dashed line in FIG. 1A. In this configuration, the microwave source drives the circuit under investigation, and the probe acts as a local microwave pick-up.

FIG. 5A shows a photograph of a microstrip line. FIG. 5B shows the receiver mode image taken with the 200 $\mu$m probe with 8.5 GHz microwave power applied to the left end of the strip, an open circuit on the right, and the probe height fixed at 50 $\mu$m. The resulting image shows a clear standing wave excitation on the microstrip, with an antinode in the center. In this configuration, the microscope is sensitive to vertical electric field lines which terminate on the surface of the exposed inner conductor. One can also tilt the probe to intercept the other components of the electric field and thus construct a complete vector electric field map at each point in three dimensions. By modifying the probe to consist of a single planar loop of wire which connects the inner and outer conductors of the probe, one can also measure the three components of the microwave magnetic field at each point in space.

A second embodiment of the invention will now be set forth in detail with reference to FIGS. 6 and 7. Microscope 1' of FIGS. 6 and 7 differs from microscope 1 of FIG. 1A in terms of an electrical circuit that locks the microwave source to a resonance of the transmission line. This -frequency locking allows measurement of the frequency shift and change in quality factor of the resonator with very high sensitivity, thus permitting cleaner images with more dynamic range and the ability to determine sample properties such as surface sheet resistance, complex dielectic constant, and topography.

The frequency-following circuit is used to measure shifts in the resonant frequencies of a near-field microwave microscope resonator. In microscope 1', as in microscope 1, microwave generator or source 3 feeds microwave energy through directional coupler 5 through an impedance discontinuity (e.g., decoupler capacitor) 7B attached to one end of transmission line 7A having an open-ended coaxial cable probe 7. A diode detector 9 is used to measure the energy escaping from the resonant circuit in reflection. At frequencies where an integer-number of half-wavelengths exactly fits inside the circuit, there will be a resonance, and a minimum of energy will be picked up by the diode detector.

According to the second embodiment, the microwave source is locked into one of the resonant frequencies. If the resonant peak moves up or down in frequency, the microwave source follows this shift using a feedback loop.

The key to this operation is frequency modulation of the microwave source. Function generator 601 does not supply its output directly to microwave source 3. Instead, the output of the function generator is supplied to the reference input of lock-in amplifier 603. The output of diode detector 9, after amplification by amplifier 11, is supplied to input A of lock-in amplifier 603. The output of lock-in amplifier 603 is fed into integrator 607, which outputs a voltage signal proportional to the frequency shift of the resonance. This signal can be amplified and recorded by the computer. The integrator output is fed into voltage adder 605, which adds the frequency modulation reference signal to the output of the integrator. The output of the voltage adder is supplied to the FM (frequency modulation) control input of microwave source 3. Thus, the microwave source 3 is modulated and given a frequency offset that follows the resonant frequency of the resonant circuit formed by the transmission line and probe.

Figure 7:
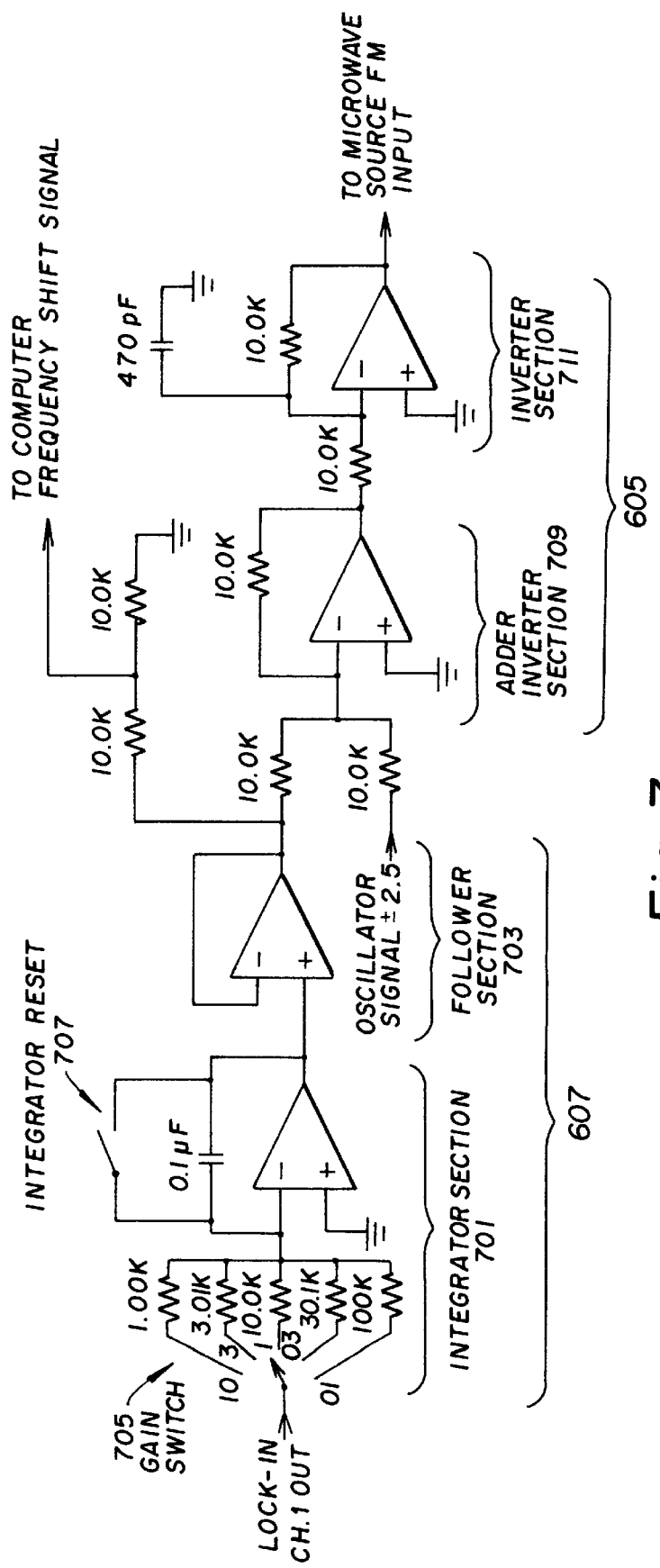
FIG. 7 shows a following circuit used in the microscope of FIG. 6.

Integrator 607 and voltage adder 605 are shown in detail in FIG. 7. Integrator 607 includes integrator section 701 and follower section 703. Integrator section 703, in addition to receiving the output of lock-in amplifier 603, includes gain switch 705, which can be configured as a knob, and integrator reset switch 707, which can be configured as a button. The output of integrator 607 is picked off to supply a frequency shift signal to the computer. Also, the output of integrator 607 and an oscillator signal sine wave from function generator 601 are supplied to adder 605, which includes adder/inverter section 709 and inverter section 711. The output of inverter section 711 is also the output of adder 605 and is supplied to microwave source 3.

Each of the integrator section 701, the follower section 703, the adder/inverter section 709, and the inverter section 711 comprises an operational amplifier (op-amp) of the LF355N type. The resistors have a precision of 1%. The 0.1 µF capacitor of integrator section 701 is a polycarbonate, high-stability capacitor.

In addition, the curvature of the resonant peak on resonance with respect to frequency can be determined with an optional second lock-in amplifier 609 referenced at twice the frequency of the function generator. The output of this second lock-in amplifier is a signal that is proportional to the curvature of the resonant peak and thus related to the width of the peak. This in turn can be related to the quality factor Q of the transmission line resonance.

Figure 6:
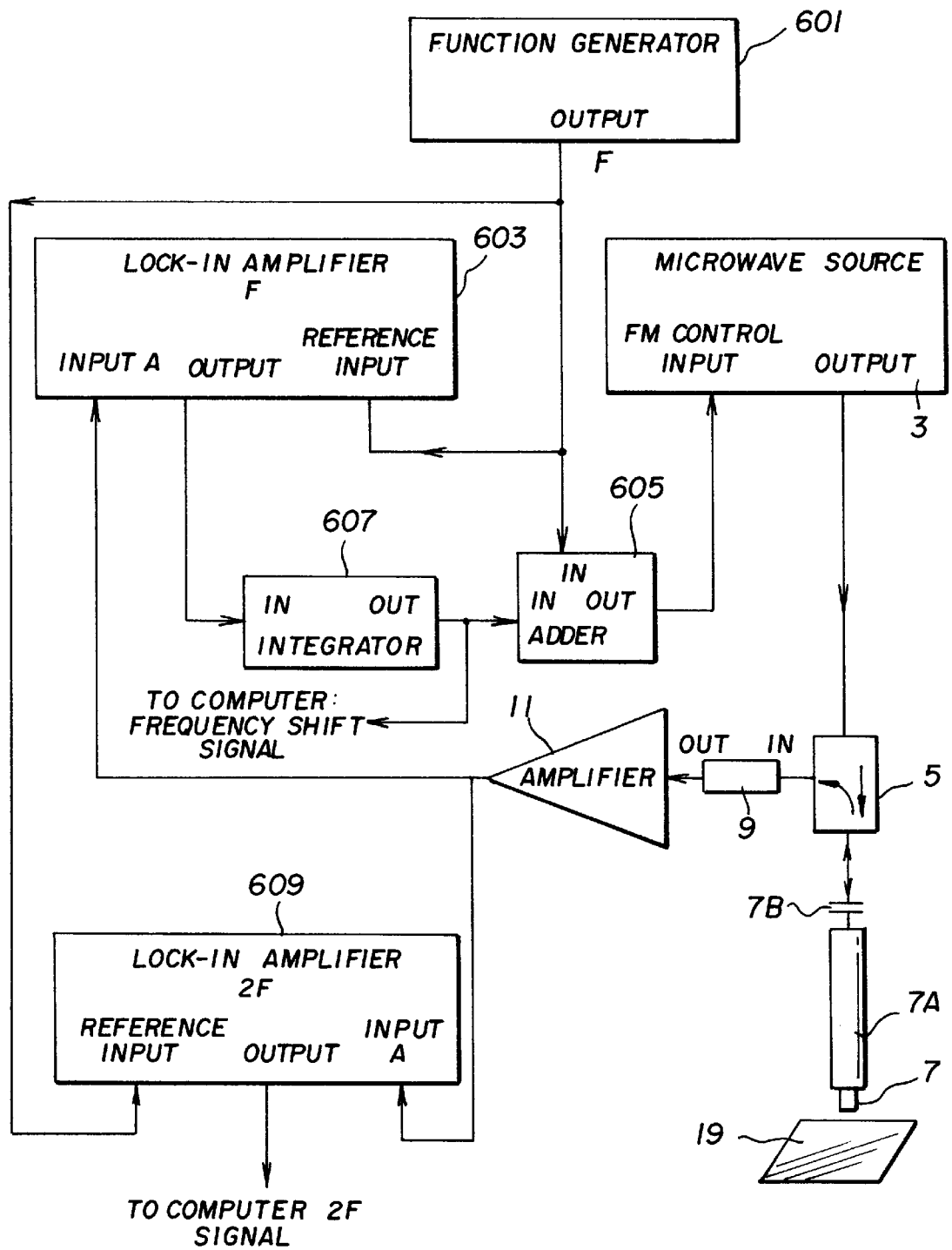
FIG. 6 shows a system schematic of a microscope according to a second embodiment of the present invention.

Microscope 1' of FIG. 6 has the following salient features in operation. Microscope 1' frequency-modulates source 3. It uses lock-in amplifier 603 and integrator 607 as a feedback loop, keeping source 3 locked onto the resonant peak. Second lock-in amplifier 609, if used, measures the curvature of the resonant peak on resonance.

The main advantages of microscope 1' are its speed and sensitivity. It is not necessary to perform a linear frequency sweep with the source, calibrate the detector, look at the curve of power vs. frequency, or use a computer to find the minimum (where the resonant frequency is located) or the curvature (which is related to the width of the peak). Such operations all take time and are computationally intensive. On the other hand, the frequency-following microscope 1' can give the frequency-shift and curvature values on-the-fly, allowing continuous changes in these quantities to be recorded as frequently as every 0.1 millisecond.

Moreover, microscope 1' has high sensitivity to frequency shifts and to changes in the curvature of the peak on resonance. The sensitivity of this circuit to frequency shifts is approximately two parts in $10^6$. The sensitivity to changes in the quality factor Q of the resonant circuit is at least one part in 10,000.

A third embodiment of the present invention will now be explained. The third embodiment can include any or all features of either or both of the first two embodiments. Further, the inner conductor of the probe in the third embodiment is extended to contact the sample. Features of the third embodiment already described above and shown in FIGS. 1A–7 will not be described again for the sake of brevity.

Figure 8:
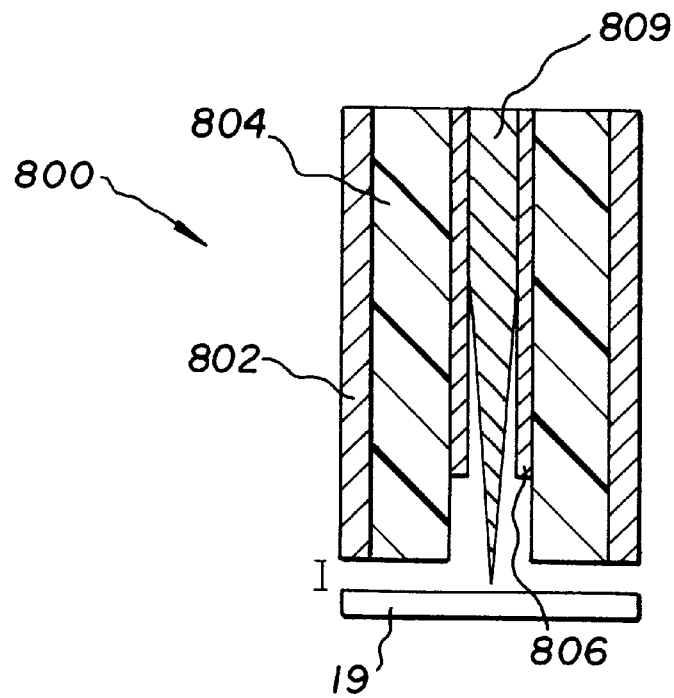
FIG. 8 shows a probe used in a third embodiment of the present invention.

In the third embodiment, the inner conductor touches the sample, and the resolution varies with the area of contact. The probe used can be that used for scanning tunneling microscopy (STM) and shown in FIG. 8. Such a probe 800 has outer conductor 802, insulator 804, inner conductor capillary tube 806, and STM tip 808. STM tip 808 tapers to an atomically fine point. The tip is made of tungsten and is 0.010 inches in diameter at its widest point.

Probe 800 has an outer jacket (conductor 802) of copper and Teflon dielectric insulator 804. The inner conductor capillary tube 806 is 0.012 inches in diameter and is made of stainless steel. The separation between the STM tip 808 and the outer conductor is minimized to insure that most of the electric field lines come from the very end of the STM tip. Similarly, the inner conductor capillary tube is made to terminate before the insulator and outer conductor terminate. This insures that the field lines from the inner conductor capillary tube do not interact with the sample.

The STM tip 808 has a smaller diameter than the inner conductor capillary tube. To prevent the STM tip form falling out of the probe during a scan, it is bent slightly before being placed by tweezers inside the capillary tube 806.

One of the disadvantages of having the probe in contact with the sample is that both the sample itself and the STM tip can be damaged if either exerts too much force on the other. To minimize the possibility of damage, the probe is hung from a spring suspended above the sample. Before running the microscope, the sample stage is raised until the tip of the probe lightly contacts the sample. The spring insures both that the probe tip is always in contact with the sample and that the tip is not exerting excessive force upon the sample. The total force of the spring is selected so as not to damage any sample whose use is anticipated.

Figure 9:
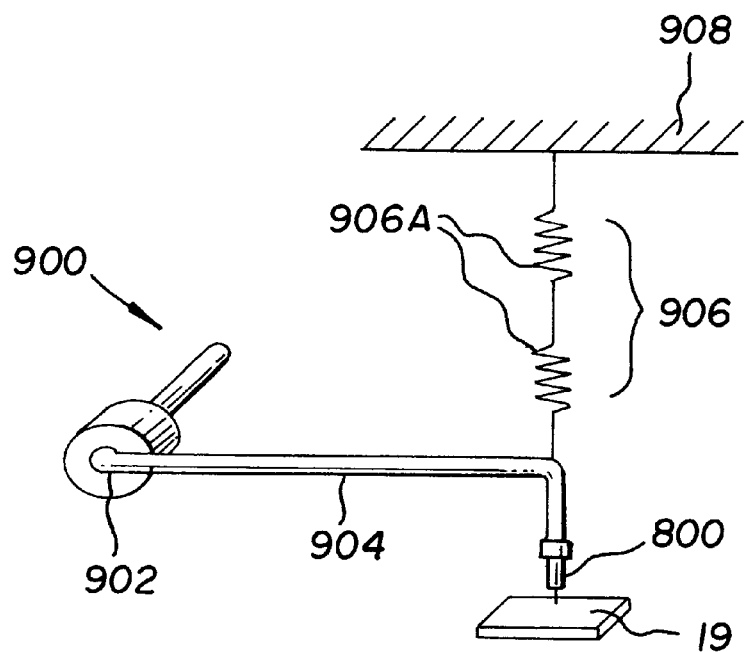
FIG. 9 shows a spring support used in the third embodiment.

In FIG. 9 rotary joint 902 allows the lever arm (bent rigid coaxial cable) 904 containing the probe 800 to rotate freely, although during the normal operation of the microscope the arm does not visibly move since the perturbations in the surface of the sample are usually very small. The lever arm 904 includes 22 cm of 0.086 inch diameter rigid coaxial cable which has been bent in two different places. The spring 906 used is actually composed of ten individual springs 906A, each with spring constant of 52.54 N/m. These springs are combined in series with each other to provide an equivalent spring constant of 5.25 N/m. One end of the chain of springs is attached to the lever arm 904, and the other end is attached to a supporting crossbeam 908 above the microscope. At equilibrium the chain of springs stretches to a length of 19.5 cm.

In contact mode, images are often taken of areas as small as ten by ten microns in size. Often, the rows in the image do not line up with each other because the microscope loses track of where it was on the sample for a variety of different reasons. The list below details some of the steps that can be taken:

Adjustment of the bits/step ratio in a position counter circuit used so that it has a reduced range but a greater precision.

Increase in the gain of the voltage output from a position counter circuit, again sacrificing range of motion for precision.

A change in the software so that position information is stored as a double precision variable.

Shielding the wiring in the counter circuit so that interference form other electrical equipment in the room does not cause glitches in the circuit.

While three embodiments of the invention have been set forth in detail, those skilled in the art will readily appreciate that other embodiments can be realized within the scope of the present invention. For example, while the microscope of FIG. 1A moves the sample, the probe itself could be moved over the sample. Also, the frequencies and quality factors of the standing wave modes could be measured separately, and images could be generated separately from each. Alternatively, magnitude and phase could be measured separately. In receiving modes, all components of the vector electric and magnetic fields could be measured with a variety of different probe geometries. Modifications disclosed separately can be combined as needed.

We claim:

1. A scanning microscope for imaging a sample, the scanning microscope comprising:

generator means for generating electromagnetic energy;

applying means, receiving the electromagnetic energy from the generator means, for applying the electromagnetic energy to the sample to form a field of electromagnetic radiation around the sample;

a probe, for placement in proximity with the sample, for receiving the electromagnetic radiation from the sample, comprising a resonant coaxial transmission line with an open end for receiving the electromagnetic radiation from the probe;

detector means for detecting the electromagnetic radiation received by the probe and for outputting an imaging signal; and means for analyzing the imaging signal.

2. A scanning microscope as in claim 1, further comprising means for causing relative movement between the sample and the probe.

3. A scanning microscope as in claim 2, wherein the means for causing relative movement comprises:

a table for holding the sample; and motor means for moving the table, thereby moving the sample.

4. A scanning microscope as in claim 1, wherein the applying means comprises a coupler for receiving the electromagnetic energy generated by the generator means and for applying the electromagnetic energy to the sample through the probe as electromagnetic radiation.

5. A scanning microscope as in claim 4, wherein:

the coupler is a directional coupler; and the electromagnetic radiation received from the sample by the probe passes through the probe and the directional coupler to the detector means.

6. A scanning microscope as in claim 1, wherein the applying means applies the electromagnetic energy to the sample by means other than the probe.

7. A scanning microscope as in claim 1, wherein:

the scanning microscope operates selectively in a receiving mode and a reflection mode; and the applying means comprises:

first applying means, comprising a coupler and operating in the reflection mode, for receiving the electromagnetic energy generated by the generator means and for applying the electromagnetic energy to the sample through the probe as electromagnetic radiation; and second applying means, operating in the receiving mode, for applying the electromagnetic energy to the sample by means other than the probe, and measuring electric or magnetic field with the probe.

8. A scanning microscope as in claim 7, wherein:

the coupler is a directional coupler; and in the reflection mode, the electromagnetic radiation received from the sample by the probe passes through the probe and the directional coupler to the detector means.

9. A scanning microscope as in claim 1, wherein:

the probe is spaced from the sample to create a resonant circuit having a resonant frequency; and further comprising feedback means for detecting a shift in the resonant frequency and for controlling the generator means in accordance with the shift in the resonant frequency so that a frequency of the electromagnetic energy generated by the generator means equals the resonant frequency.

10. A scanning microscope as in claim 9, wherein:

the generator means comprises function generator means for generating a waveform with a predetermined frequency; and the feedback means comprises:

a lock-in amplifier, receiving the signal output by the detector means and the waveform generated by the function generator means, for producing a lock-in output;

an integrator, receiving the lock-in output, for producing an integration signal indicating the shift in the resonant frequency; and an adder, receiving the integration signal and the waveform generated by the function generator means, for adding the integration signal and the waveform and for outputting a frequency control signal to control generation of the electromagnetic radiation by the generator means.

11. A scanning microscope as in claim 10, wherein the integrator comprises:

a gain switch for selecting a gain of the integrator; and a reset switch for resetting the integrator.

12. A scanning microscope as in claim 10, wherein the integrator comprises:

a first operational amplifier, having a negative input for receiving the lock-in output and a positive input connected to ground, for integrating the lock-in ouput; and a second operational amplifier, having a positive input for receiving an output of the first operational amplifier and a negative input connected for feedback from an output of the second operational amplifier, for functioning as a follower.

13. A scanning microscope as recited in claim 12, wherein the adder comprises:

a third operational amplifier, having a negative input for receiving both the output of the second operational amplifier and the waveform and a positive input connected to ground, for outputting an inverted sum of the output of the second operational amplifier and the waveform; and a fourth operational amplifier, having a negative input for receiving the output from the third operational amplifier and a positive input connected to ground, and a connection between negative input and output for feedback.

14. A scanning microscope as in claim 9, further comprising curvature determining means, receiving the signal output by the detector means, for determining a curvature of a resonant peak of the resonant circuit.

15. A scanning microscope as in claim 14, wherein:

the generator means comprises function generator means for generating a waveform with a predetermined frequency; and the curvature determining means comprises a lock-in amplifier referenced at twice the predetermined frequency.

16. A scanning microscope as in claim 1, wherein the probe comprises:

an outer conductor; and an inner conductor having a tip which extends beyond the outer conductor for contacting the sample.

17. A scanning microscope as in claim 16, further comprising spring support means for regulating a contact force between the probe and the sample.

* * * * *

UNITED STATES PATENT AND TRADEMARK OFFICE
CERTIFICATE OF CORRECTION

PATENT NO. : 5,900,618

DATED : May 4, 1999

INVENTOR(S) : Anlage et al.

It is certified that error appears in the above-identified patent and that said Letters Patent is hereby corrected as shown below:

Column 1, Line 21, please insert a comma after the word wavelength, -- wavelength, --

Column 3, Line 5, delete "three inner and outer conductors of the probe", and insert -- three dimensions --

Column 3, Line 8, please insert -- using a coaxial probe terminated in a loop -- after the word space Column 4, Line 21, please delete "ΩSMA", and insert therefor -- Ω SMA --

Column 4, Line 37, delete "))", insert therefor -- ) --

Column 4, Line 38, delete "menas", insert therefor -- means --

UNITED STATES PATENT AND TRADEMARK OFFICE
CERTIFICATE OF CORRECTION

PATENT NO. : 5,900,618
DATED : May 4, 1999
INVENTOR(S) : Anlage et al.

It is certified that error appears in the above-identified patent and that said Letters Patent is hereby corrected as shown below:

Column 4, Lines 45-50 delete $$|V_-| = \frac{|V(\omega)|}{\left|\left(1+\frac{Z_s}{Z_0}\right)\left(\frac{1+i\omega C_x Z_0}{1-i\omega C_x Z_0}\right)e^{-2ikL}+\left(1-\frac{Z_s}{Z_0}\right)\right|}$$

$$\approx \frac{V(\omega)}{\sqrt{2\left[1+\left(\frac{Z_s}{Z_0}\right)^2\right]+2\left[1-\left(\frac{Z_s}{Z_0}\right)^2\right]\cos(2k(L+cZ_0 C_x))}}$$

and insert therefor, $$|V_-| = \frac{|V(\omega)|}{\left|\left(1+\frac{Z_s}{Z_0}\right)\left(\frac{1+i\omega C_x Z_0}{1-i\omega C_x Z_0}\right)e^{-2ikL}+\left(1-\frac{Z_s}{Z_0}\right)\right|^{1/2}}$$

$$\approx \frac{|V(\omega)|}{\sqrt{2\left[1+\left(\frac{Z_s}{Z_0}\right)^2\right]+2\left[1-\left(\frac{Z_s}{Z_0}\right)^2\right]\cos(2k(L+cZ_0 C_x))}}$$

UNITED STATES PATENT AND TRADEMARK OFFICE
CERTIFICATE OF CORRECTION

PATENT NO. : 5,900,618
DATED : May 4, 1999
INVENTOR(S) : Anlage et al

It is certified that error appears in the above-identified patent and that said Letters Patent is hereby corrected as shown below:

Column 4, Line 52, delete "K", and insert therefor -- κ --

Column 4, Line 66, delete "V", and insert therefor -- V_ --

Column 7, Line 62, delete "form", and insert therefor -- from --

Signed and Sealed this

Seventh Day of December, 1999

Attest:

Q. TODD DICKINSON

*Attesting Officer*         *Acting Commissioner of Patents and Trademarks*